Jan. 24, 1956     H. G. CLAMANN     2,731,877
PNEUMATIC REFRACTOMETER
Filed July 20, 1953     2 Sheets-Sheet 2
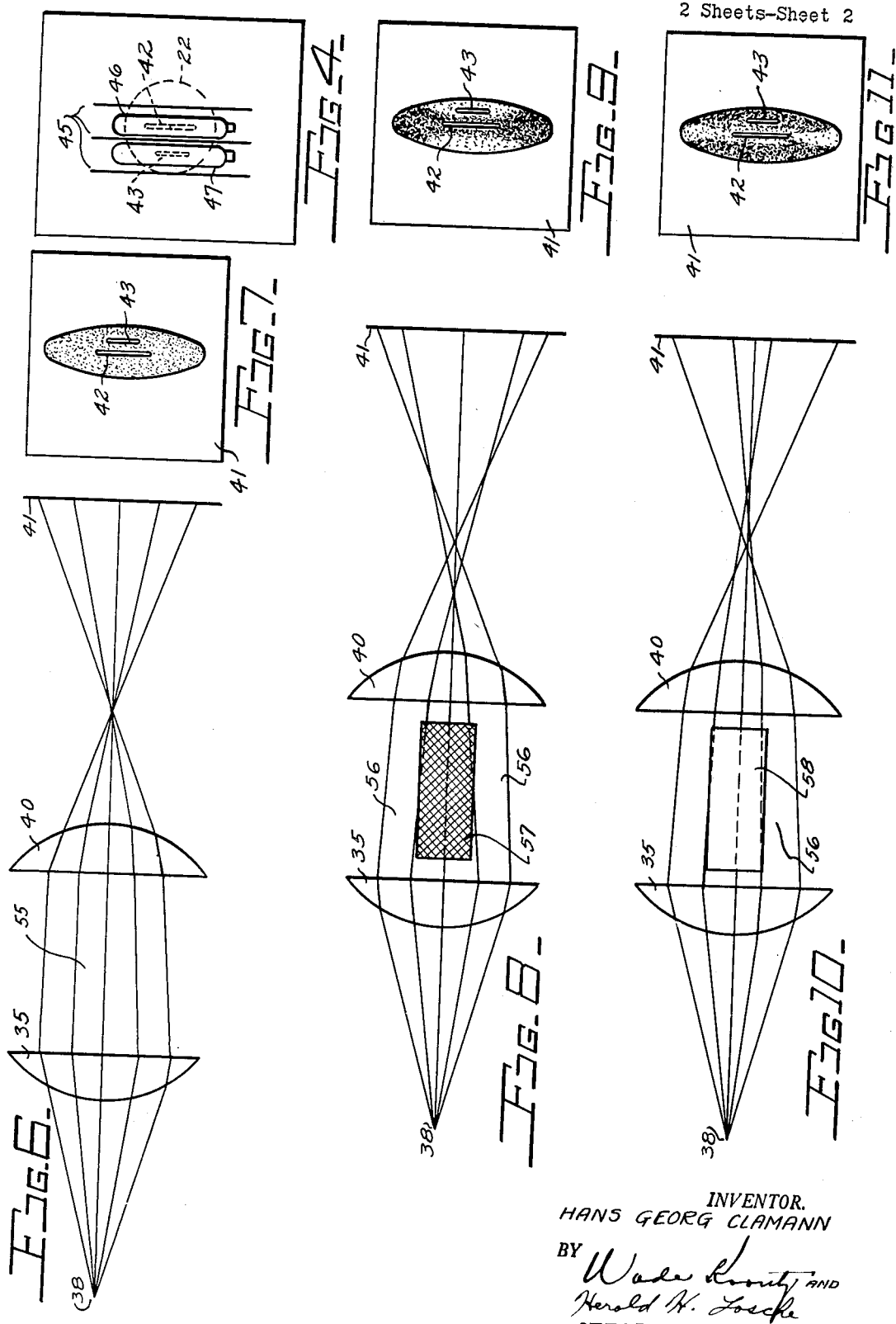
INVENTOR.
HANS GEORG CLAMANN
BY
ATTORNEYS.

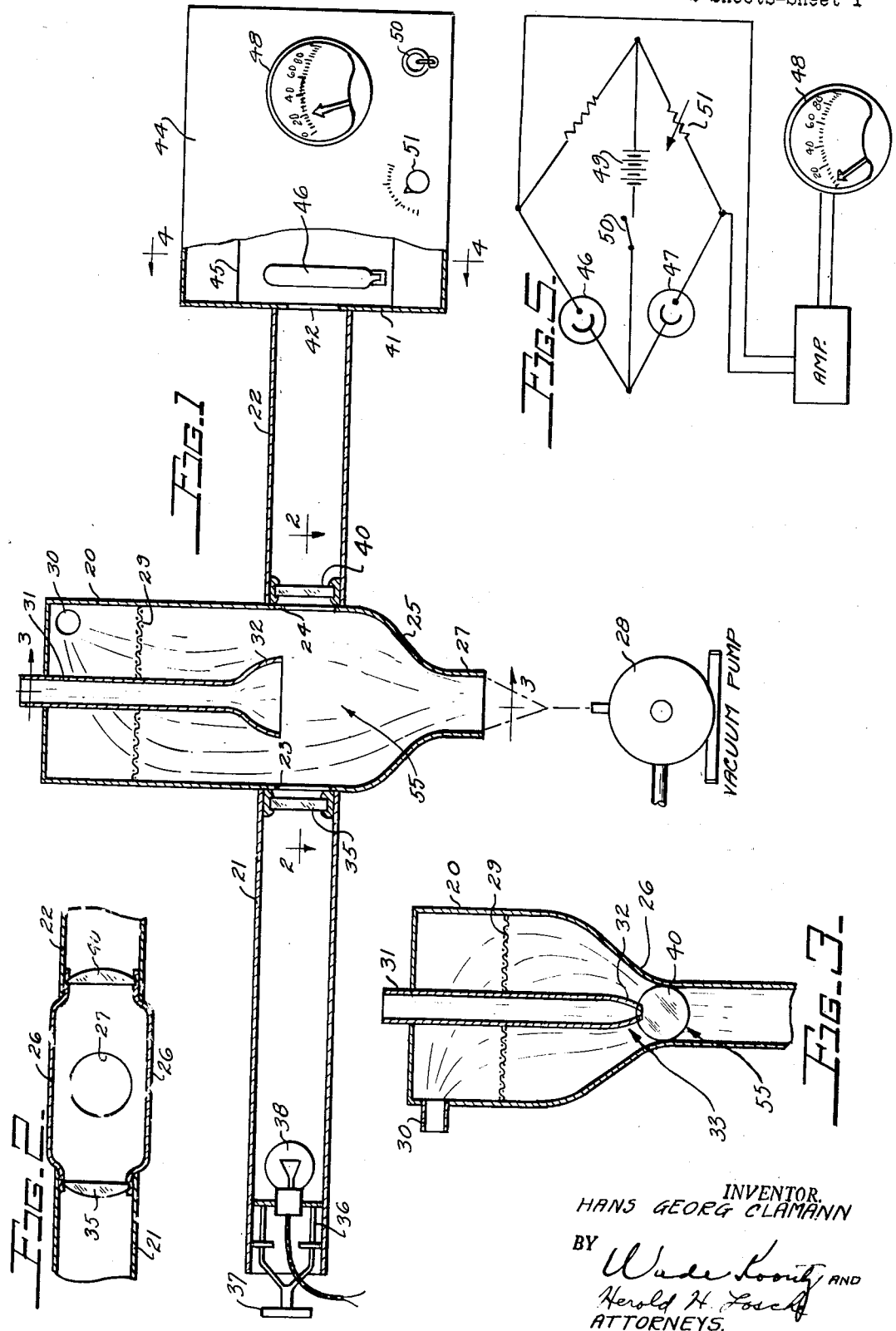

United States Patent Office 2,731,877
Patented Jan. 24, 1956

2,731,877
PNEUMATIC REFRACTOMETER

Hans Georg Clamann, Converse, Tex., assignor to the United States of America as represented by the Secretary of the Air Force Application July 20, 1953, Serial No. 369,258

11 Claims. (Cl. 88—14)

(Granted under Title 35, U. S. Code (1952), sec. 266)

This invention may be manufactured and used by or for the Government for governmental purposes without the payment of royalty thereon.

This invention relates to refractometers and particularly to pneumatic refractometers of the non-specific type which take advantage of the scientific principle that the refractive index of a gas is proportional to its density, or in a mixture of gases with different refractive indices, is proportional to the concentration. This pneumatic refractometer is light in weight, compact, and fast and continuous in its analysis which analysis may be observed or recorded.

With the coming of faster and higher flying aircraft, the need for an aircraft refractometer—that is, a refractometer to be carried in the aircraft—has become great and critical to provide a continuous analysis of the cabin air to properly control the replacement of oxygen and the elimination of carbon dioxide for aircraft personnel and passengers. The carbon dioxide content rises very rapidly as people increase their work or exertion. Many known analyzers are most valuable and capable as laboratory instruments but are too bulky, as the mass spectrograph, or not rugged enough, as the infrared analyzers, to be suitable for use in aircraft.

The pneumatic refractometer of the present invention is small, compact, light, rugged, and reliable for use in an aircraft, although its use is not restricted or particularly adapted for aircraft, but may have general application. A known or reference gas and the unknown or gas to be analyzed are pulled through an analyzer cell by a vacuum pump. The analyzer cell of this invention is specifically constructed to produce a laminar stream of the two gases, the gas to be analyzed being admitted in the analyzer cell from a slit-like nozzle to produce a flat band which becomes imbedded in the reference gas. Diffusion is prevented between the gases in the analyzed area by reason of the velocity of flow. The analyzer cell has windows on opposite sides thereof through which a beam of light from a single filament light source is passed to a screen. The windows have cylindrical condenser and objective lenses therein having their axes parallel to the filament of the light source. The brightness of the images formed on the screen changes in accordance with the difference in refractive indices of the reference and analyzed gases. The screen can be observed or recordings can be made directly therefrom, or a photocell pickup may be used behind a slit in the screen to give micro-ammeter readings or other electro-pictorial recordings, as desired. It is contemplated to use two photoelectric cells in a bridge circuit with one operating to compensate for varying light intensity of the light source. A non-specific analysis, or comparative analysis in accordance with a reference gas, is therefore provided to indicate the gas content from which it may be determined that the compound gas is within the physiological or other desirable limits. It is therefore a general object of this invention to provide a non-specific pneumatic refractometer by analysis of a known gas and a gas to be analyzed in laminar flow through an analyzing cell, the laminar flow being traversed by a light beam to produce light patterns on a screen in accordance with the relative refraction of the light rays in the beam which light patterns may be observed or recorded.

These and other objects, advantages, features, and uses will become more apparent as the description proceeds when taken in consideration of the accompanying drawings, in which:

Fig. 1 is a longitudinal cross-sectional view of the refractometer device with part of the controlling elements shown in elevation;

Fig. 2 is a partial cross-sectional view of the analyzing cell taken along the lines 2—2 of Fig. 1;

Fig. 3 is a vertical cross-sectional view of the analyzing cell taken along the line 3—3 of Fig. 1;

Fig. 4 is a diagrammatic elevational view of the back side of the screen taken along the line 4—4 of Fig. 1 wherein the sectioning of the baffles 45 is omitted for clarity;

Fig. 5 is a schematic wiring diagram of the photoelectric pickup circuit;

Figs. 6 and 7 illustrate rays traced through the cylindrical windows of the analyzing cell with a single gas therein and the light pattern on the screen;

Figs. 8 and 9 illustrate the rays traced through a reference gas with an unknown denser gas imbedded therein and the light pattern produced on the screen; and Figs. 10 and 11 illustrate the rays traced through a reference gas with an unknown rarer gas imbedded therein and the corresponding light pattern on the screen.

Referring more particularly to Fig. 1 with occasional reference to Figs. 2 to 4, there is shown an analyzing cell 20 with two lateral tubular extensions 21 and 22 thereon. The analyzing cell 20 may be square or round with opposed openings 23 and 24 just above a reducing portion 25 in the vertical plane through the openings. In a vertical plane through the analyzing cell normal to the vertical plane through the openings the cell 20 has a reducing portion 26 which provides a flat flow portion in the reduced portion 26 down to the reduced portion 25 where a tubular outlet 27 is formed. These two reduced portions may best be realized by comparing Figs. 1, 2 and 3. The outlet 27 is connected to a vacuum pump 28 for reasons that will presently be understood. Across the upper portion of the analyzer 20 is a screen 29 through which gas entering through an inlet 30 passes to the outlet 27. Extending concentrically through the top of the analyzer cell 20 and the screen 29 is a tubular conduit 31 having a flattened end or nozzle portion 32 which forms a venturi portion 33 in the reduced portion 26 of the analyzing cell 20. (See Fig. 3.) The reference gas is connected to the inlet 30 and the unknown gas is connected to the conduit 31 and both gases are drawn through the analyzing cell 20 and through the outlet 27 by the vacuum pump 28. The gas flow is rapid which causes the unknown gas to produce a thin band imbedded in the reference gas in the analyzed area between the two openings with the faces of the band being in planes passing through the openings. A manometer may be connected to the vacuum line to indicate the working vacuum and to permit regulation of the vacuum pump, where desirable.

In the lateral tubular extension 21 and over the opening 23 is a cylindrical condenser lens 35 having its axis vertical or parallel to the axis of the analyzing cell body 20. In the outer end of the tubular extension 21 is a slidable element 36 having a handle 37 extending outside the tube and an electric socket supporting a single filament bulb 38 on the inner end thereof. The element 36 is slidable longitudinally of the tube 21 to change the focus through the cylindrical lens 35.

In the lateral tubular extension 22 and over the opening 24 is a second cylindrical lens 40 having its axis parallel to the axis of the first cylindrical lens 35. Over the outer end of the tubular extension 22 is a screen 41 with two elongated vertical slits 42 and 43 therein (see Fig. 4), the slit 42 being arranged centrally or along a diameter of the tubular extension 22 while the slit 43 is positioned along a chord thereof. The screen 41 also forms the end of a case 44 housing the electrical means of the device. Attached to the screen 41 and extending perpendicularly therefrom into the case 44 are three light baffles 45 that provide two light baffled spaces, one over each slit 42 and 43. In each light baffled space is positioned a photoelectric cell 46 and 47, respectively, that is coupled in a manner presently to be described, to drive a microammeter 48 or other measurement or recording device to produce readings in accordance with the light falling on the cells.

Referring to Fig. 5, there is shown a wiring diagram in which the two photoelectric cells are illustrated with the same reference characters 46 and 47. The photoelectric cell 46 is in one branch of a bridge circuit and the cell 47 is in the other branch of the bridge circuit. The bridge circuit is provided a potential by a battery 49 through a switch 50. The bridge circuit can be adjustably balanced by a variable resistance 51 in one of the branches. The photoelectric cell 46 being in the path of the slot 42 receives the refracted light through the analyzing cell which is the light directly in the center of the light patterns formed on the screen 41 as will presently by made clear. The intensity of the light falling on the cell 46 is recorded on the micro-ammeter 48. The light passing through the slot 43 is from the central peripheral portion of the light pattern, as will presently be made clear, and this light is always directly proportional to the light intensity of the bulb 38. Variations in light intensity of the bulb 38 cause changes in conduction of the cell 47 to compensate for those changes on the refracted ray to the cell 46. Thus correct readings may be obtained from the micro-ammeter although there are variations in the light intensity of the bulb 38.

Figs. 6 and 7 illustrate the light rays from the source 38 passing through the two cylindrical lenses 35 and 40 and the light pattern formed on the screen 41. The area 55 between the lenses is the analyzed area being the area just below the nozzle 32 of the conduit 31. Adjustment of the bulb 38 in the lateral tube 21 by the knob 37 makes it possible to control the convergence of the rays from the cylindrical lens 35. In Fig. 6 the convergent rays in the analyzed area 55 are represented as passing through a single gas and are not refracted. These rays pass through the second cylindrical lens 40, through the focus, and onto the screen 41 to present the light pattern which is substantially uniformly lighted, Fig. 7.

Referring to Figs. 8 and 9, the analyzed area 55 is being traversed by a reference gas 56 and a denser fluid 57 to be analyzed. The darkened cross-hatched portion 57 represents the gas to be analyzed as it streams out of the nozzle 32 (Fig. 1) across the analyzed area 55 and is imbedded in the reference gas 56. As may be seen, the outer rays continue their course substantially as before but those rays passing through the gas stream 57 are refracted due to a change of index of refraction from the reference gas. The gas 57 to be analyzed in this illustration is denser than the reference gas 56 which produces a light pattern, as seen in Fig. 9, that has a dark center portion.

Figs. 10 and 11 illustrate the analysis of an unknown gas 58 that is rarer than the reference gas 56 producing a bright central portion in the light pattern shown in Fig. 11.

The slit 42 is positioned in the screen 41 where the central portion of the light pattern, representing the analyzed gas, will fall. This part of the light pattern passes through the slit 42 and falls on the photoelectric cell 46, as described above. The part of the light pattern falling over the slit 43 will pass through to the photoelectric cell 47, as described above. The light patterns may be observed or photographed from a plane screen, as 41 without the slits, where it is desirable to eliminate the photoelectric circuit. It is believed that it is readily understood that the analysis of the unknown gases is fast and accurate with a piece of equipment readily portable for use in the laboratory, aircraft, or other movable or stationary positions.

In the operation of the pneumatic refractometer, a gas of known density or index of refraction is introduced through the inlet 30 and a gas of unknown density or index of refraction is connected to the conduit 31. With the vacuum pump 28 in operation the two gases will be pulled through the analyzer across the analyzing area 55 at a high velocity providing a laminar flow of the two gases without any diffusion. Light rays from the light source 38 will pass through the cylindrical lens 35, the analyzing area 55 below the nozzle portion 32, the cylindrical objective lens 40, and the slits 42 and 43 to the photoelectric cells 46 and 47. The cell 46 will respond to the light in the center of the light pattern representing the gas to be analyzed, the light intensity on the photoelectric cell being represented on the microammeter 48. By representative calculation of the microammeter 48 it can readily be determined whether the analyzed gas has a greater or lesser index of refraction than the reference gas. The pneumatic refractometer being based on the ratio between a reference and an analyzed gas excludes, to a great extent, disturbances from temperature and pressure. This pneumatic refractometer is especially well adapted for use in aircraft to determine the oxygen and carbon dioxide content in the cabin since this refractometer analyzes immediately and continuously and since it is small, compact, rugged, and light in weight. While the invention has been shown and described as to its preferred use with gases it is to be understood that analysis of fluids in general may be accomplished.

While I have shown and described the preferred form of my invention it is to be understood that many changes and arrangements may be made in the constructional details and features of this invention without departing from the spirit and scope thereof and I desire to be limited only by the scope of the appended claims.

I claim:

1. A fast and continuous acting pneumatic refractometer comprising; an analyzing cell having two laterally aligned tubular extensions, two inlets, and a flattened constricted outlet in the plane of said lateral extensions to provide a flattened flow area, one of said inlets entering said analyzing cell in a portion across the plane of said lateral extensions from said constricted outlet and the other of said inlets entering said analyzing cell through a flattened nozzle centrally of said flattened flow area between said lateral extensions with the lateral extensions, the flattened flow area, and the flattened nozzle lying in the same plane; a longitudinally adjustable single filament lamp in one of the lateral tubular extensions; a cylindrical lens in each lateral tubular extension at the adjacent ends thereof with the axes thereof lying parallel to the lamp filament; a screen over the outer end of the other of said lateral tubular extensions with slit means therein parallel to the lamp filament; and light responsive means behind said slit means in said screen to convert light falling thereon into electrical potentials for driving measurement devices proportional to the intensity of the light whereby a comparative analysis of a reference fluid passed through said one of said inlets and an unknown fluid passed through the other of said inlets will be determined from the measurement devices.

2. A pneumatic refractometer as set forth in claim 1 wherein said slit means in said screen consists of one slit positioned to receive refracted rays of said beam of light from the unknown fluid and of another slit positioned to receive refracted rays of said beam of light from the reference fluid, and said light responsive means is a photoelectric cell circuit with a photoelectric cell behind each slit, said photoelectric cell receiving the refracated rays of said beam of light from the unknown fluid producing an output potential in accordance with the intensity of those rays and said photoelectric cell receiving refracted rays of said beam of light from the reference fluid producing electrical potentials in said circuit to compensate for variations in intensity in said beam of light whereby the comparative analysis is not rendered erroneous by changes in light intensity of said single filament lamp.

3. A fast and continuous acting pneumatic refractometer comprising an analyzing cell, means to direct a reference fluid and an unknown fluid in contact through said cell in laminar flow without substantial intermixing of the two fluids, said fluids being of different chemical composition, means to direct a beam of light across said cell transversely to the flow of and through said fluids, said laminar flow being such that a central layer of unknown fluid has a layer of reference fluid on either side of it whereby a portion of the light will pass through reference and unknown fluid and another portion of the light will pass through reference fluid only, so it is possible to separately analyze and compare the refracted light from said unknown fluid with the refracted light from said reference fluid in such a manner that the composition of the unknown fluid is quantitatively indicated and wherein variations of light intensity of said beam of light are automatically compensated.

4. A pneumatic refractometer as set forth in claim 3 wherein the means to compare the refracted light from the fluids is a screen upon which the refracted light from the fluids is directed producing a light pattern indicative of the composition of the unknown fluid.

5. A pneumatic refractometer as set forth in claim 4 wherein said means to direct said fluids is a Venturi tube portion through which said reference fluid flows and an enclosed conduit positioned to introduce said unknown fluid centrally to said Venturi tube portion.

6. A pneumatic refractometer as set forth in claim 5 wherein said means to direct a beam of light across said cell transversely to the flow of and through said fluids and onto a screen are laterally extending aligned tubes on said cell, one tube having a longitudinally adjustable light source in the outer end thereof and a condensing lens in the end at said cell, and the other tube having an objective lens at said cell and said screen over the outer end thereof.

7. A pneumatic refractometer as set forth in claim 3 wherein the refracted light from the reference fluid is compared with the refracted light from the unknown fluid as to intensity by slit means and light sensitive means.

8. A pneumatic refractometer as set forth in claim 7 wherein said slit means comprises two slits, one slit positioned to receive refracted rays from the unknown fluid and the other positioned to receive refracted rays from the reference fluid, and a photoelectric cell behind each slit, said photoelectric cells being in a bridge circuit with said photoelectric cell receiving said refracted rays from the unknown fluid capable of producing electrical potentials in the output of said circuit in accordance with the light intensity of the refracted rays from the unknown fluid and with said photoelectric cell receiving said refracted rays from the reference fluid capable of compensating said circuit for variations of light intensity of said beam of light.

9. A fast and continuous acting pneumatic refractometer comprising an analyzing cell, means to direct a reference gas and an unknown gas across said cell in laminar flow, means to direct a beam of light across said cell through the laminar flow of said gases onto a screen having slit means therein, said slit means comprising two slits, one slit positioned to receive refracted rays from the unknown gas and the other slit positioned to receive refracted rays from the reference gas, and a photoelectric cell behind each slit, said photoelectric cells being in a bridge circuit with said photoelectric cell receiving said refracted rays from the unknown gas capable of producing electrical potentials in the output of said circuit in accordance with the light intensity of the refracted rays from the unknown gas and with said photoelectric cell receiving said refracted rays from the reference gas capable of compensating said circuit for variations of light intensity of said beam of light.

10. A pneumatic refractometer as set forth in claim 9 wherein a vacuum pump connected with the outlet of said cell is used to pull the reference and unknown gases through said cell in laminar flow.

11. A pneumatic refractometer as set forth in claim 10 wherein baffles are used between said photocells to insure that light from each slit falls only on its respective photocell.

References Cited in the file of this patent

UNITED STATES PATENTS

| | | |
|---|---|---|
| 830,225 | Haber | Sept. 4, 1906 |
| 1,770,355 | Roi | July 8, 1930 |
| 2,362,235 | Barnes | Nov. 7, 1944 |
| 2,421,854 | Seaman | June 10, 1947 |